United States Patent

Heinrich et al.

[11] Patent Number: 5,971,135
[45] Date of Patent: Oct. 26, 1999

[54] DEFLECTABLE CHAIR MOUNTED PIN ASSEMBLY FOR CONVEYOR

[75] Inventors: Dag Heinrich, Penzberg; Gerhard Winklhofer, Munich, both of Germany

[73] Assignee: Joh. Winklhofer & Sohne GmbH & Co. KG, Germany

[21] Appl. No.: 08/876,889

[22] Filed: Jun. 16, 1997

[30] Foreign Application Priority Data

Jun. 18, 1996 [DE] Germany .......................... 296 10 702

[51] Int. Cl.$^6$ ................................................. B65G 17/16
[52] U.S. Cl. ................................ 198/487.1; 198/803.12; 198/719
[58] Field of Search ............................. 198/719, 803.12, 198/487.1

[56] References Cited

U.S. PATENT DOCUMENTS

| | | | |
|---|---|---|---|
| 4,533,039 | 8/1985 | Grims | 198/651 |
| 5,232,083 | 8/1993 | Motominami et al. | 198/803.12 |
| 5,275,664 | 1/1994 | Brown et al. | 198/803.12 |

FOREIGN PATENT DOCUMENTS

| | | |
|---|---|---|
| 2408996A | 11/1977 | France . |
| 93-14-261 U | 11/1993 | Germany . |
| 93-14-261 U | 1/1994 | Germany . |

Primary Examiner—William E. Terrell
Assistant Examiner—Mark Deuble
Attorney, Agent, or Firm—Miller, Sisson, Chapman & Nash, P.C.

[57] ABSTRACT

A conveyor apparatus having a conveyor chain and at least one supporting arm used for attaching thereto objects which are to be conveyed. The supporting arm has one of its ends connected to the conveyor chain via an overload protection means. The overload protection means has a tilting joint which is provided between the supporting arm and the conveyor chain and permitting reversible tilting of the supporting arm relative to the conveyor chain in response to a predetermined load. In the structural design of the conveyor apparatus the tilting joint is acted upon by a helical tension spring.

3 Claims, 2 Drawing Sheets

DEFLECTABLE CHAIR MOUNTED PIN ASSEMBLY FOR CONVEYOR

BACKGROUND OF THE INVENTION

The present invention relates to a conveyor apparatus of the type having a chain and a tiltable pin. Such a conveyor with a conveyor chain and a tiltable pin is known from U.S. Pat. No. 4,533,039. The pin comprises a base secured to the chain. The sleevelike main body of the pin is connected to the base via a piece of wire rope. In order to permit tilting of the pin, the fastening point of the piece of wire rope is arranged in the interior of the main body such that it is adapted to be displaced against the tensioning force of a compression spring resting on the displaceable fastening point and on a plug which is secured to the main body and through which the piece of wire rope extends. This structural design is comparatively complicated and, consequently, expensive.

A further conveyor apparatus is shown in German Utility Model 93 14 261. This conveyor apparatus is used for transporting cans or other hollow articles. The cans are attached individually to respective supporting arms, which extend horizontally and transversely to the direction of transport and which have one of their ends secured to the conveyor chain. The other end of the respective supporting arm, or rod, is free and extends freely away from the conveyor chain over a length corresponding at least to the length of the can. This structural design inevitably has the effect that, especially at higher speeds of the conveyor chain, the supporting arm will begin to vibrate. Due to the comparatively long lever arm defined by the supporting arm, there is the risk that the conveyor chain will be affected. In order to avoid this, the supporting arm is connected to the chain via a damping member which is capable of absorbing vibrations. In view of the fact that although the damping means is capable of absorbing the vibrations during normal operation, it is incapable of absorbing higher loads which act on the supporting arm and of keeping them away from the chain. The prior art conveyor apparatus is provided with an overload protection means in the form of a predetermined breaking point arranged on the supporting arm close to the point where the supporting arm is secured to the conveyor chain. This predetermined breaking point is provided for guaranteeing that the supporting arm will break without seriously affecting the conveyor chain when an excessively strong force acts on said supporting arm. When a predetermined breaking point is used, the predetermined load, which is to be avoided so as to prevent the conveyor chain from being damaged, must not be chosen too small such that the regular operation of the conveyor chain is not disturbed too often and too long. On the other hand, the predetermined force must not be so high as to prevent the overload protection means from accomplishing its task in a reliable manner, i.e., the task of protecting the conveyor chain against damage. The use of a predetermined breaking point makes it very difficult to control the predetermined load. It is difficult to eliminate by means of a predetermined breaking point loads which are, in principle, not high, but which recur frequently and cause then damage to the conveyor chain.

Hence, it is the object of the present invention to provide a conveyor apparatus with an overload protection means having a simplified structural design.

SUMMARY OF THE INVENTION

The tilting joint provided according to the present invention to the supporting arm yields in response to a predetermined load and returns to its original conveying position when the load is no longer applied. Thus, the predetermined load may be chosen comparatively low without damage being caused to the supporting arm and without any repair work being required later on. In this way, the load on the conveyor chain and, consequently, the risks that this chain may be damaged, are considerably reduced. The spring mechanism of the present invention provides a structurally simple and expedient way of adjusting the predetermined load in response to which tilting will take place for the first time. It is expedient to tension the helical tension spring between the conveyor chain and the supporting arm.

The invention ensures that the conveyor chain is protected irrespectively of the direction in which the load acts on the supporting arm.

The invention guarantees that, after having been tilted, the supporting arm will return to its correct conveying position.

A particularly preferred geometrical shape of the centering body produces a good centering effect on the one hand and does not impair the tilting movement on the other.

The supporting arm may be connected to the conveyor chain in the usual way by means of an adapter pin which simultaneously constitutes part of the chain.

On the basis of the connection between the supporting arm and the conveyor chain via a tilting joint, the adapter pin which secures the supporting arm in position may be fastened to the conveyor chain in a simple manner via a conventional retainer ring, a cotter pin or some other well-known position retaining assembly.

Further, the adapter pin which secures the tiltable supporting arm in position may be connected to the conveyor chain via a damping means.

BRIEF DESCRIPTION OF THE DRAWINGS

In the following, one embodiment of the present invention will be described in detail on the basis of the drawings, in which.

DETAILED DESCRIPTION OF THE PREFERRED EMBODIMENT

Figure 1:
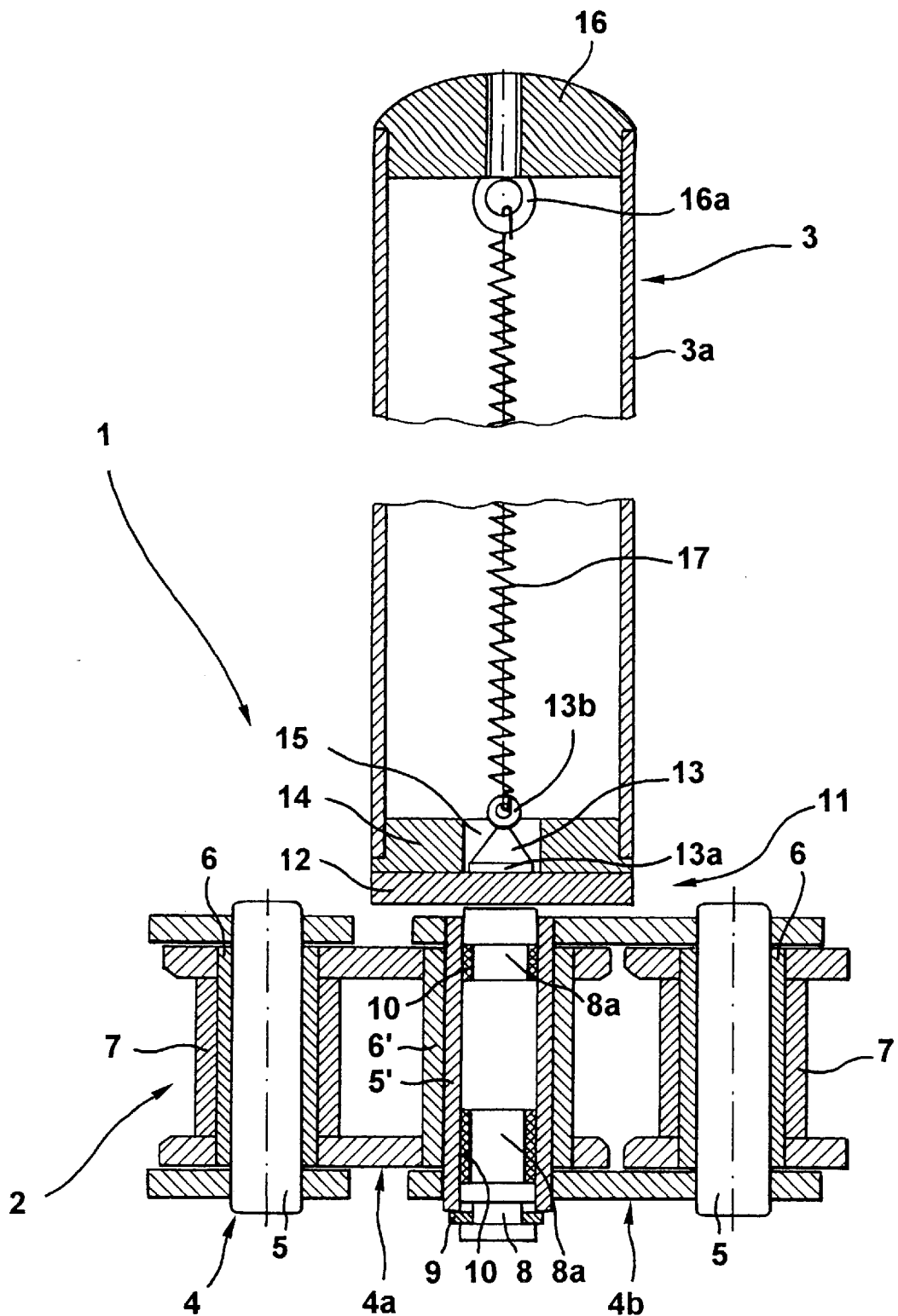
FIG. 1 shows a section through part of a conveyor means provided with a tiltable supporting arm in accordance with the present invention.

FIG. 1 shows a conveyor apparatus 1 according to the present invention comprising a conveyor chain 2 and a plurality of supporting arms 3 which are secured to the chain 2 at predetermined intervals, e.i., with a predetermined spacing. The detail shown in the figures comprises only a small area of the chain 2 and only one supporting arm 3.

The chain 2 is shown as a pintle chain and, as is normally the case with this type of chain, it comprises a plurality of chain links 4 having inner link plates 4a and outer link plates 4b and interconnected via hinge pins 5 such that they are adapted to be pivoted at least in one plane. Other types of chains may incorporate the present invention.

The linking connection may be established via hollow pins 6 which are fixedly connected to the inner link plates 4a. The respective hinge pins 5 are rotatably received in the hollow pins 6, the hinge pins 5 being, in turn, fixedly connected to the outer link plates 4b. In this way, the inner and outer link plates 4a, 4b may be pivoted relative to one another about the central axis of the pins 5. Rollers 7, which reduce the friction at the driving gears (not shown), are rotatably supported on said hollow pins 6.

For securing the supporting arm 3 in position, individual hinge pins 5 are replaced by additional hollow pins 5' at intervals determined by the spacing. The hollow pins 5' move in hollow pins 6' which have an enlarged diameter (press-fitted to the inner link plate 4a). The free-running roller 7 is not provided, but the outer diameter of the hollow pin 6' corresponds to the outer diameter of the rollers 7.

In the interior of the hollow hinge pin 5', an adapter pin 8 is received, which extends beyond the hollow hinge pin 5' on both sides thereof. On the side facing away from the supporting arm 3, the adapter pin 8 is secured against axial displacement by means of a conventional retainer ring 9, which may be snapped in position in a groove provided on said adapter pin 8. The ring 9 abuts on an end face of the hollow hinge pin 5' projecting beyond the outer link plate 4b. The axial length of the adapter pin 8 located in the interior of the hollow hinge pin 5' is provided with two axially spaced circumferential grooves 8a. Each of the grooves 8a accommodates a damping member 10. Each damping member 10 may consist of a piece of hose cut from a rubber hose, or from other elastomer hose, such that it corresponds to the width of the groove 8a. The member 10 is arranged in the respective groove 8a in a vibration-transmitting manner such that it is biased in the radial direction.

On the side located opposite the retainer ring 9 and beside the chain 2, the supporting arm 3 is arranged on the adapter pin 8 via a tilting joint 11. The tilting joint 11 includes a seat plate 12 which is secured to the adapter pin. The seat plate 12 is disk-shaped having its circumference in alignment with the circumference of the supporting arm 3. The seat plate 12 has a centrally secured conical centering body 13. The centering body 13 has a generally cylindrical base 13a and an eyelet 13b secured to the top of the body 13.

The supporting arm 3 in the preferred embodiment is a hollow cylindrical body with a tubular wall 3a. On the end facing the seat plate 12, the tubular wall 3a is closed by a plug 14. A centering opening 15 extends centrally through the plug 14. The centering opening 15 is generally cylindrical and has a diameter which is at least equal to or slightly larger than the outer diameter of the cylindrical base 13a of the centering body 13.

The free end of the tubular wall 3a of the supporting arm 3 facing away from the chain 2 is closed by an additional plug 16. A second eyelet 16a is centrally screwed into plug 16. The two ends of an extensible helical tension spring 17 are attached to the eyelet 16a of the plug 16 and to the eyelet 13b of the centering body 13. The spring 17 is placed under a predetermined tension such that the supporting arm 3 is drawn by the spring 17 towards the seat plate 12 with a predetermined force. The opposed end faces of the plug 14 and of the seat plate 12 are drawn thereby into tight surface contact with each other.

The pretension of the spring 17 is chosen such that the supporting arm 3 (shown in FIG. 1), the axis of supporting arm 3, and the axis of the adapter pin 8 are in alignment with one another. This alignment will be maintained under the weight of the supporting arm 3 plus the weight of the attached hollow body plus the forces introduced by the transport speed plus the loads caused when the hollow body is attached and removed in a normal manner.

Figure 2:
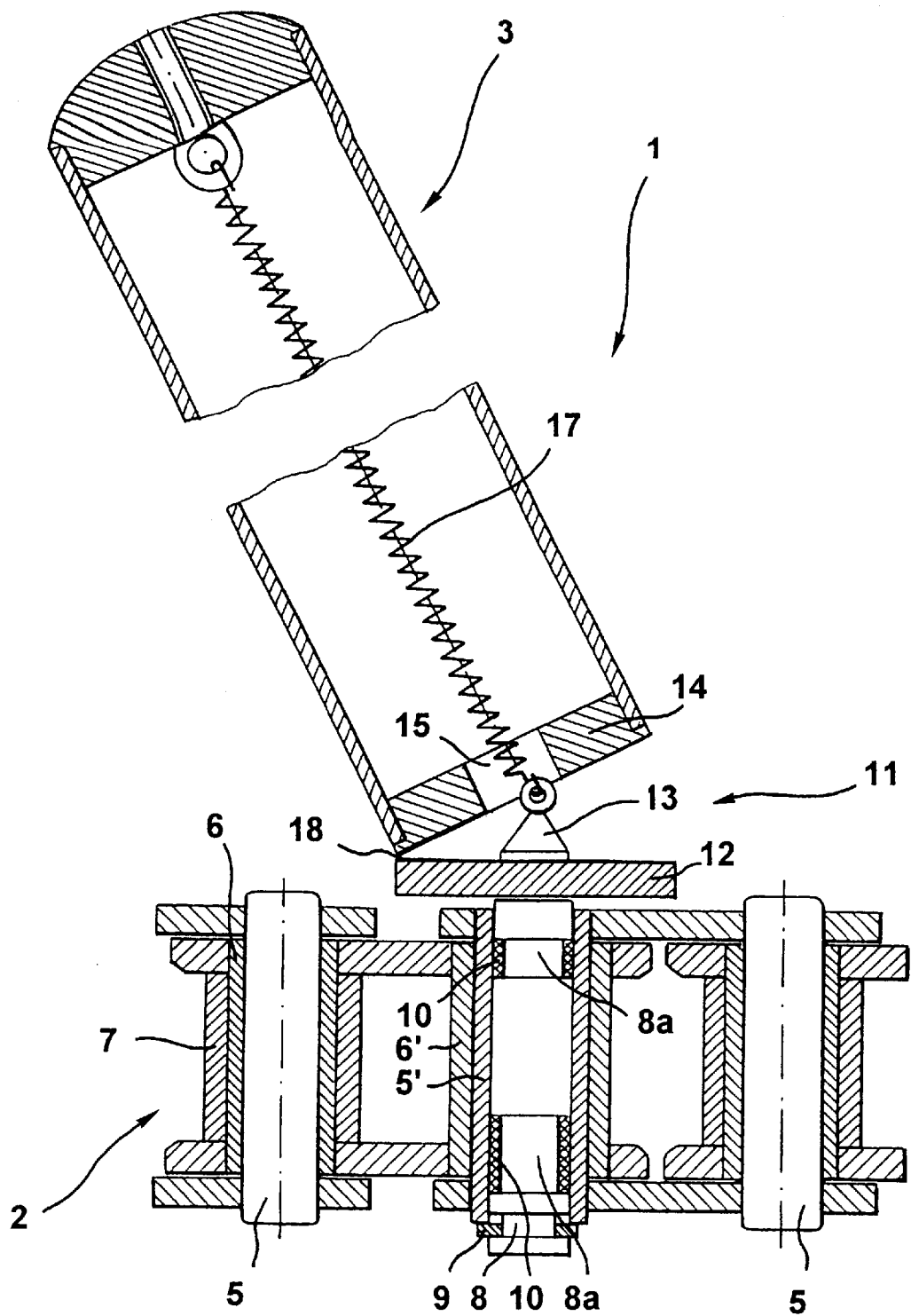
FIG. 2 shows the representation according to FIG. 1 in the tilted condition of the supporting arm.

If the load acting on the supporting arm 3 is exceeded, e.g., by a sudden shock, in such a way that there is the risk of chain damage, the supporting arm 3 may avoid the excessive load by tilting about the tilting joint 11, as may be seen in FIG. 2. During the tilting movement, a point, which is diametrically opposed to the load and which is located on the end of the supporting arm 3 facing the chain 2, rests on the seat plate 12. This may be seen in FIG. 2 as point 18. In most cases, this point will subsequently migrate towards the centering body 13 due to the effect produced by the spring 17. This rest point then acts as a tilting center for the tilting movement of the supporting arm 3. The centering opening 15 is lifted off the centering cone 13 in the course of this movement and the spring 17 is additionally tensioned. As may be readily seen, the tilting center 18 may be located at any point along the entire circumference of the supporting arm 3 such that the supporting arm 3 may yield, irrespectively of the direction in which the excessive load is applied.

It may also be seen that the supporting arm 3 may yield at least to such an extent that its free end will reach each point on an imaginary hemisphere whose basis coincides with the seat plate. When the load ceases to exist, the spring 17 will draw the supporting arm 3 back into tight contact with the seat plate 12. In the course of this drawing process, the axial alignment between the supporting arm 3 and the adapter pin 8 again will be established by the centering body 13 moving into the centering opening 15.

As a modification of the embodiment which has been described and shown in the figures, the tilting joint may also be used in combination with supporting arms having a different structural design and in combination with other chains. In accordance with a kinematic reversal, it is an alternative to provide the centering body on the supporting arm and the centering opening in the seat plate. In such a case, it would be expedient to accommodate the spring in the interior of the adapter pin. Instead of the helical tension spring described, other suitable loading mechanisms, e.g., on the basis of a frictional resistance or the like, may be used. If excessive loads are to be expected from only one, predetermined direction, a tiltable joint with a fixed tilting axis may be provided instead of a joint permitting tilting movements in all directions. Finally, the adapter pin, the seat plate, and the centering body may be rotatably accommodated in the interior of the hollow pin so as to enable self-alignment when the chain moves.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

We claim:

1. A conveyor apparatus for conveying objects comprising:

a conveyor chain;

at least one supporting arm for attachment to said objects, said supporting arm having a first end connected to said conveyor chain through an overload protection means, said overload protection means comprising a reversible tilting joint between said supporting arm and said conveyor chain and responsive to a predetermined load, said tilting joint pretensioned by a helical tension spring;

a centering seat comprising a centering body and a centering opening between said conveyor chain and said supporting arm, said centering body has a first eyelet secured to a top of said body attachable to helical tension spring.

2. A conveyor apparatus for conveying objects comprising:
- a conveyor chain;
- at least one supporting arm for attachment to said objects, said supporting arm having a first end connected to said conveyor chain through an overload protection means, said overload protection means comprising a reversible tilting joint between said supporting arm and said conveyor chain and responsive to a predetermined load, said tilting joint pretensioned by a helical tension spring;
- a centering seat comprising a centering body and a centering opening between said conveyor chain and said supporting arm;
- said supporting arm is a hollow cylindrical body with a tubular wall closed by a first plug on an end facing said seat plate, said centering opening extending centrally through said plug; and
- a free end of said tubular wall of said supporting arm faces away from said conveyor chain and is closed by a second plug having a second eyelet attachable to said helical tension spring.

3. A conveyor apparatus for conveying objects comprising:
- a conveyor chain;
- at least one supporting arm for attachment to said objects, said supporting arm having a first end connected to said conveyor chain through an overload protection means, said overload protection means comprising a reversible tilting joint between said supporting arm and said conveyor chain and responsive to a predetermined load, said tilting joint pretensioned by a helical tension spring;
- a centering seat comprising a centering body and a centering opening between said conveyor chain and said supporting arm;
- said supporting arm is a hollow cylindrical body with a tubular wall closed by a first plug on an end facing said seat plate, said centering opening extending centrally through said plug; and
- a first end of said helical tension spring is attached to said second eyelet and a second end of said helical tension spring is attached to said first eyelet, said helical tension spring being under said predetermined load, said supporting arm drawn by said helical tension spring towards said seat plate with a predetermined force, opposed end faces of said first plug and of said seat plate drawn into tight surface contact with each other.

* * * * *